Oct. 23, 1934.  R. S. OLIVER ET AL  1,977,996
BIRD CAGE
Filed March 25, 1933  5 Sheets-Sheet 1

Inventors
Robert S. Oliver
Frank V. Meindl
By Rockwree Bartholow
Attorneys

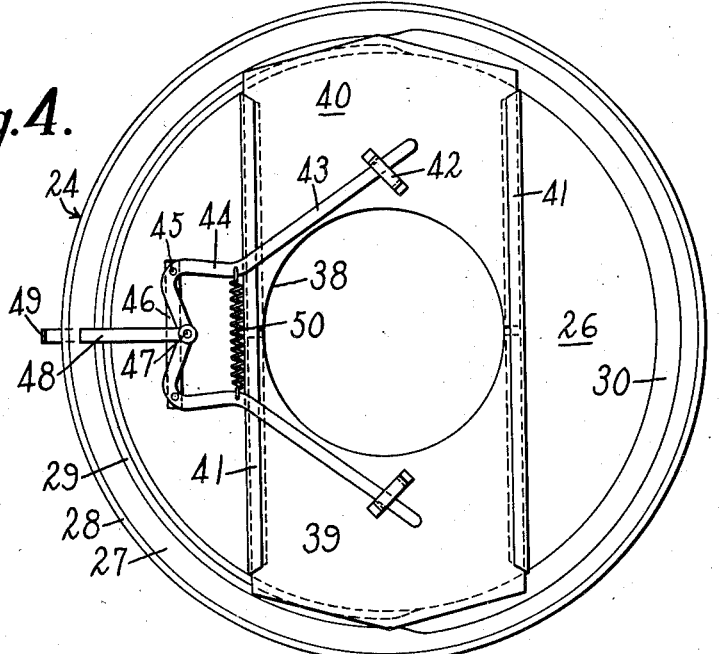
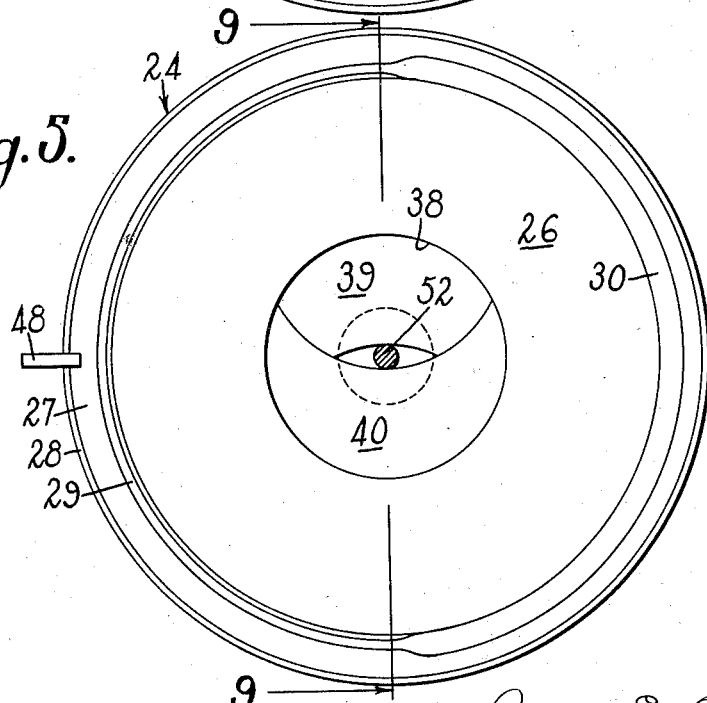

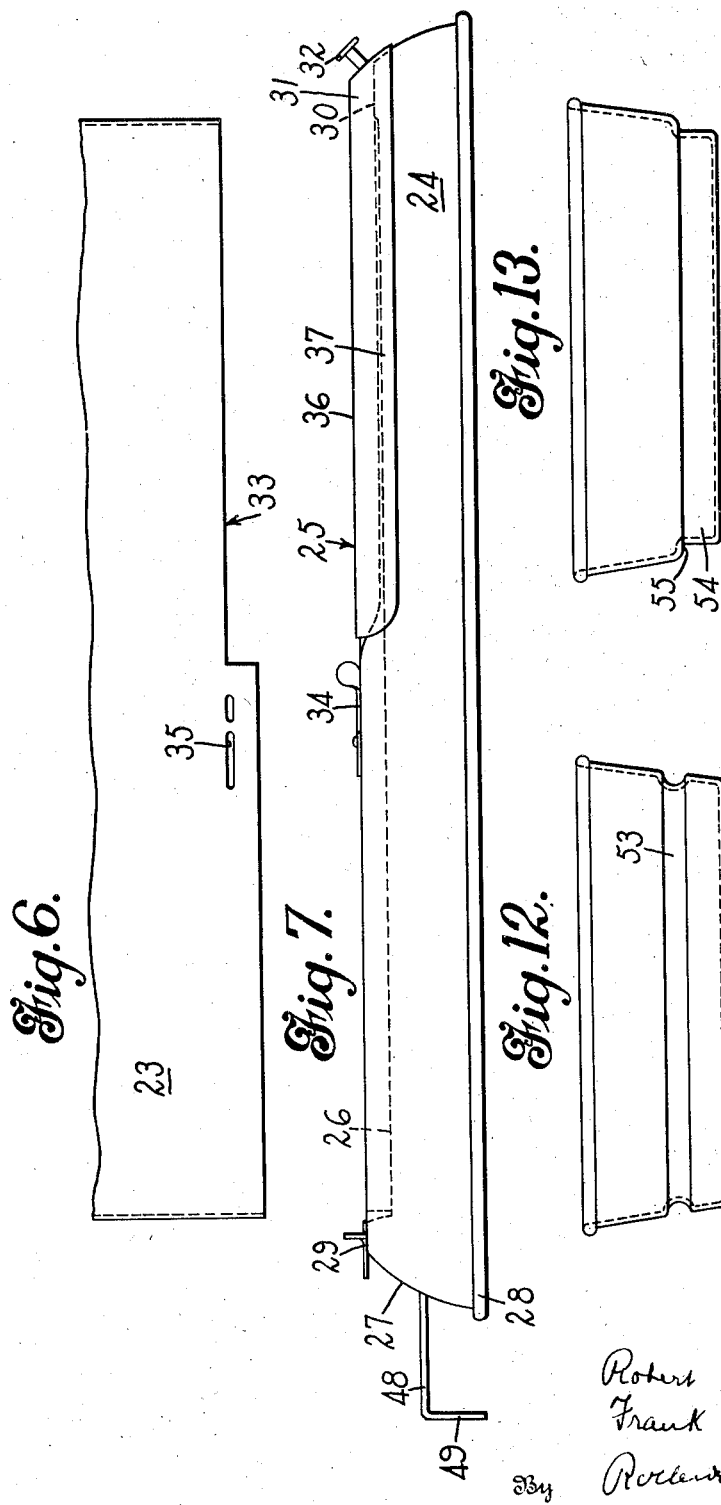

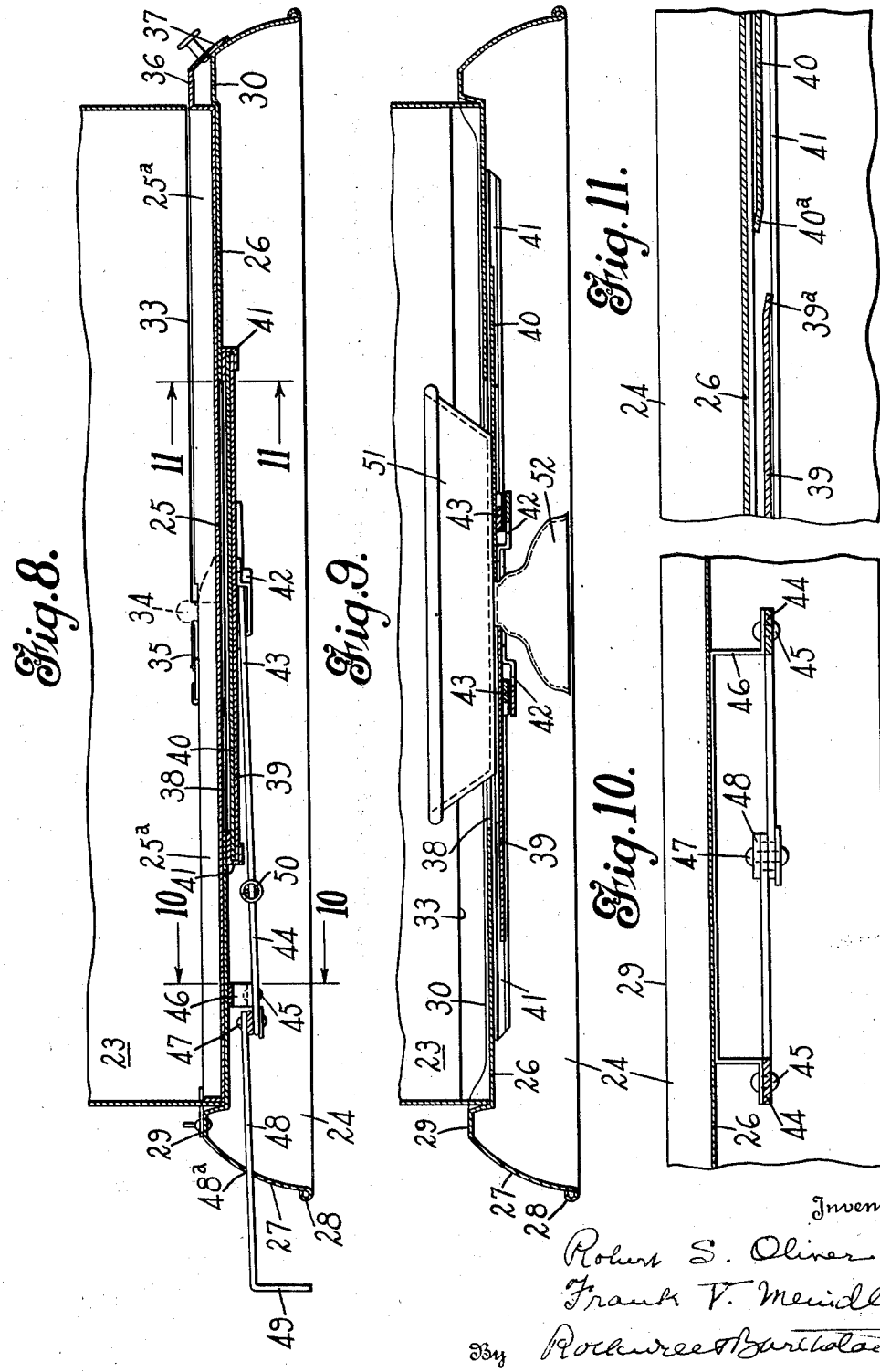

Oct. 23, 1934. R. S. OLIVER ET AL 1,977,996
BIRD CAGE
Filed March 25, 1933 5 Sheets-Sheet 5

Inventors
Robert S. Oliver
Frank V. Meindl
By Rockwell & Bartholow
Attorneys

Patented Oct. 23, 1934

1,977,996

UNITED STATES PATENT OFFICE 1,977,996

BIRD CAGE

Robert S. Oliver, New Haven, Conn., and Frank V. Meindl, Chicago, Ill., assignors to The Andrew B. Hendryx Company, New Haven, Conn., a corporation of Connecticut Application March 25, 1933, Serial No. 662,696

2 Claims. (Cl. 119—17)

One of the objects of our invention is to produce a light-weight and relatively inexpensive bird cage structure of improved form.

Another object is to provide improved instrumentalities whereby the bird in the cage can be furnished with facilities for taking a bath in water or other liquid when this is desired.

Another object is to provide improved means whereby a bath basin or cup can be introduced into the cage and to provide improved means for holding a bath basin or cup in position in the cage.

By our improvements the base of the cage is normally closed but can be opened conveniently for the introduction of a bath cup into the lower part of the cage, and the cup when placed in position will be firmly held against displacement so that the bird cannot upset the same when taking a bath therein, or otherwise, and the cup can be placed in position in the cage and removed therefrom without the necessity of disconnecting the base from the bird cage body and without any likelihood of the bird making his escape from the cage at a time when the bath cup or receptacle is being placed in the cage or removed.

To these and other ends the invention consists in the novel features and combinations of parts to be hereinafter described and pointed out in the claims.

In the accompanying drawings:

Fig. 4 is a view similar to Fig. 3 showing the base opened for the introduction of the bath receptacle;

Fig. 5 is a top plan view of the base with the drawer removed showing the manner of holding the bath cup in position; a portion of the bath cup being shown in section;

Fig. 6 is an enlarged fragmentary view of the lower portion of the bird cage body;

Fig. 7 is an enlarged side elevation of the base;

Fig. 8 is an enlarged section on line 8—8 of Fig. 1;

Fig. 9 is a section on line 9—9 of Fig. 5 taken at right angles to the section of Fig. 8 and showing the bath cup in position in the cage;

Fig. 10 is an enlarged section on line 10—10 of Fig. 8;

Fig. 11 is an enlarged section on line 11—11 of Fig. 8;

Figs. 12 and 13 show modified forms of bath receptacles; and

Figure 1:
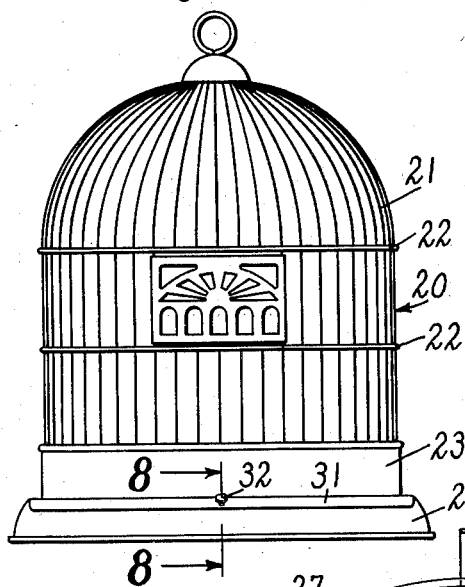
Fig. 1 is a front elevation of a bird cage embodying our improvements.
Figure 2:
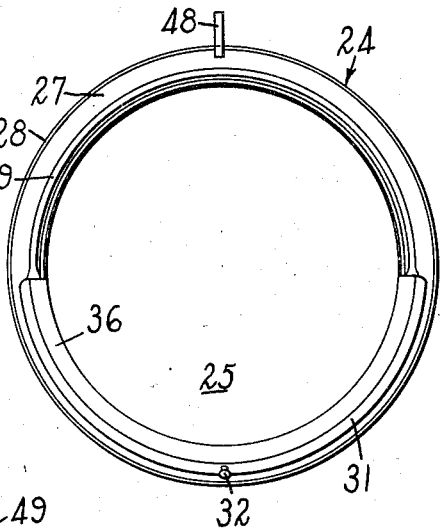
Fig. 2 is a top plan view of the base of the cage showing the drawer or tray in position therein, the cage body being removed.
Figure 3:
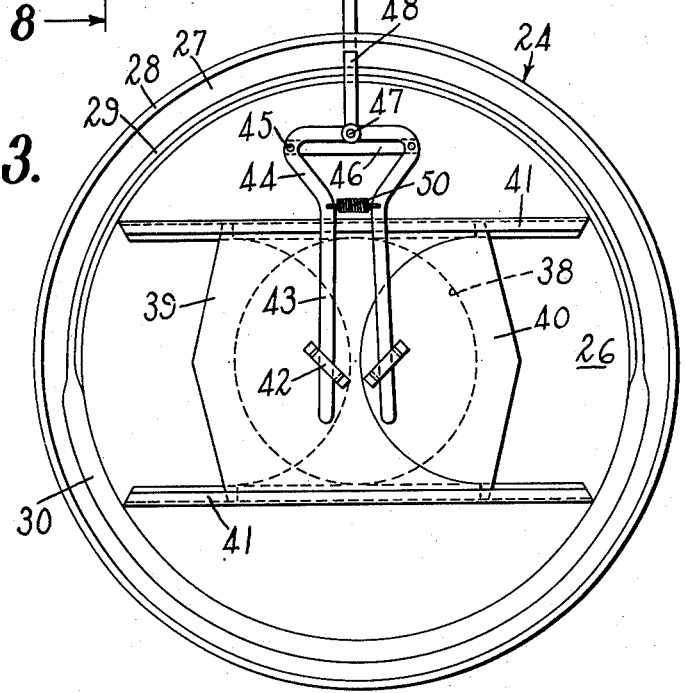
Fig. 3 is a bottom plan view of the base on a somewhat larger scale showing the floor or cage bottom in the normal closed condition.

Referring to the drawings, and particularly to Figs. 1 and 2, it will be noted that we have illustrated our improvements in connection with a bird cage having a body 20 comprising the usual wires 21, rails 22, and lower band 23. The bird cage body is detachably connected to a base member 24 in such a manner that the cage body can be readily applied to or removed from the base member. The cage is also provided with a sliding drawer member or tray 25 adapted to be placed in position adjacent the lower end of the cage body so as to act as a floor or bottom for the cage enclosure as long as the drawer is in place. This drawer or tray can be withdrawn in a convenient manner and hence when it becomes soiled it can be readily cleansed. During the time that the drawer is out of the cage the upper portion of the base member acts as a closure to prevent the escape of the bird, such upper portion of the base member acting as a support for the drawer to sustain it from beneath when the drawer is in position in the cage. The base member is provided with means, hereinafter more particularly described, whereby it can be opened for the introduction into the cage enclosure of a receptacle holding liquid in which the bird can bathe.

In the particular form shown, the base member 24 is pressed from sheet metal having a depressed floor portion 26 surrounded by an upstanding rim, said rim being continued downwardly at the exterior to provide a down-turned peripheral wall 27 having at the lower edge a bead 28. The rim of the base has two portions, one of which is relatively high and narrow, as shown at 29, and the other portion of which is relatively low and wide, as shown at 30, these two portions forming in conjunction a complete circular rim for holding and positioning the round body with which the drawer 25 is provided. The drawer 25 is preferably pressed from sheet metal and has a round bottom or floor and an upstanding flange at its periphery. This flange at the front portion of the base where the lower rim portion 30 is located is provided with an apron 31 adapted to overlie the base member 24 at the front portion thereof in the manner shown in Fig. 7. At the front of the drawer and upon the apron 31 is a small knob 32 by means of which the drawer may be withdrawn from the cage.

The drawer 25 is introduced into and withdrawn from the cage by way of an opening or slot formed between the lower edge portion of the band 23 and the upper portion of the base member 24. At the front of the cage the band 23 is notched at the bottom, as shown at 33 in Fig. 6, so as to provide a reentrant recess at the edge of the band adapted to receive the drawer. At the rear portion of the cage the band 23 extends down within the rim on the base, and this rear portion of the band, which is of greater height than the front portion, is adapted to be received within the higher rim portion 29 of the base and to be secured in position by pivoted catches 34 on the base engaging slots 35 in the lower portion of the band. Other forms of catches can be used, if desired. The recessed portion 33 of the band overlies the lower rim portion 30 of the base and is spaced therefrom in such a manner that the drawer 25 with its front apron may be received in the lower portion of the cage, and when the drawer is in place the apron 31 is in line with the higher rim portion 29 of the base and conforms to the contour thereof so as to close the slot provided between the band and base member, said apron 31 being supported from beneath by the front portion of the base member.

Preferably the drawer has a short upwardly projecting flange 25ª throughout its periphery, this flange, at the rear portion of the cage, lying somewhat below or at the level of the top of the higher rim portion 29, and this flange, at the front portion of the cage, being integrally continued to form the horizontal member 36 and the outwardly and downwardly inclined member 37 (Fig. 8) which constitute the apron portion 31 of the drawer. It will also be understood that at the rear portion of the cage the band 23 lies between the exterior surface of the flange 25ª and the upstanding rim portion 29 of the base member.

The floor portion or web 26 of the base member is provided with an aperture for the introduction of a bath receptacle into the cage, and associated with this aperture is movable means for closing the same. The aperture may be round, as shown at 38 in Fig. 5, and for normally maintaining the aperture in a closed position we may use spring pressed closure plates 39 and 40 rectilinearly guided in narrow flanged guideways 41 on the lower surface of web 26. The plates 39 and 40 are mounted to slide in opposite directions, and by a suitable lever mechanism they can be withdrawn so as to clear the aperture 38. This lever mechanism is acted upon by a spring which normally holds the plates in position to close the aperture 38. The forward edges of the plates are curved so as to conform to the shape of the aperture 38 and fully expose the same when the plates are moved away from each other and toward the rim of the base. Each of the plates 39, 40 has a keeper or clip 42 applied to the lower face thereof, and entering each keeper or clip is one leg 43 of a bell crank lever 44 pivoted intermediate of its ends at 45 to the web or floor of the base member by means of a bracket member 46, welded or otherwise suitably secured to the base member, as shown in detail in Fig. 10. The outer ends of the bell crank levers are turned inwardly toward each other and pivoted at 47 to a manipulating slide member 48 guided in the base member. The slide member 48 projects out through a slot 48ª in the depending wall of the base member and has a down-turned outer end 49 which can be pressed by the thumb or finger for the purpose of moving the closure plates 39, 40. The spring for maintaining the plates in the closed position may be conveniently located and it may be disposed, for example, between the bell crank levers 44, as shown at 50. In the form shown the spring 50 is a coil spring connected at its opposite ends to the inwardly extending legs of the bell crank levers.

When the slide 48 is pushed inwardly by the thumb or finger the inwardly projecting longer legs of the bell crank levers are separated from each other against the action of the spring 50, as shown in Fig. 4, and the plates are moved away from the aperture 38 so as to uncover the same. A bath receptacle may then be inserted into the cage from beneath. A suitable receptacle for this purpose is shown in Fig. 9 at 51, and in this particular case the receptacle is held in position by the plates 39, 40. The receptacle 51 consists of a body or cup having attached to the bottom thereof a small pedestal 52, and when the slide member 48 is released, the bath receptacle can be held in position by the engagement of the plates 39, 40 with the receptacle at or adjacent the neck portion formed between the receptacle body and pedestal, as shown in Fig. 9. By engaging the receptacle at opposite sides the plates 39, 40, which are pressed against the pedestal by the spring 50, hold the bath receptacle in position, with the cup portion of the receptacle projecting upwardly into the lower portion of the cage enclosure and with the pedestal of the cup disposed below the floor portion or web of the base member. In this manner the bath receptacle can be conveniently and firmly held in position in the cage in such a manner that the bird can take a bath in the receptacle.

It will be understood, of course, that when the bath receptacle is introduced into the cage the drawer number 25 will not be in position in the cage.

In Fig. 11 we have shown the conformation of the advanced end portions of the plates 39, 40. These are bent somewhat out of their normal planes as shown at 39ª and 40ª so that after the plates have been completely separated from each other they will not jam or obstruct each other in closing, but will, on the other hand, readily pass each other owing to the opposite inclination of their tips or extremities.

Fig. 5 shows how the curved forward edges of the plates 39, 40 engage the downwardly projecting pedestal-like portion 52 provided on the bottom of the bath cup. By snugly engaging a receptacle portion which is of reduced diameter, the opposing edges of the plates prevent displacement of the bath receptacle in a vertical direction and the receptacle is firmly held in place on or near the floor of the base member. Thus the receptacle will not be overturned by the bird in bathing or by other movements of the bird in the cage.

It is understood, of course, that when the plates 39, 40 are in the position shown in Fig. 5, the spring 50 acts on the plates in such a manner as to press them against an interposed portion of the bath receptacle from opposite sides of such interposed portion.

When it is desired to give the bird facilities for bathing, the drawer 25 is removed, the receptacle 51 filled with water, and then after the slide member 48 has been pushed in so as to uncover the aperture 38, the receptacle may be very readily lifted, by manipulating the pedestal 52, into position within the lower portion of the cage enclosure. The member 48 is then released and the spring 50 will thereupon act to bring the plates into impingement with the bath receptacle from opposite sides in order to hold it firmly in position. It is not always necessary, however, to provide a receptacle like receptacle 51, as various forms of receptacle may be used. In Figs. 12 and 13 we have shown two further examples of a suitable bath receptacle. In the form shown in Fig. 12 the receptacle has an inclined peripheral wall provided about midway of its height with a peripheral depression forming a groove 53 with which the edges of the plates 39, 40 may be engaged. In the form shown in Fig. 13 the receptacle has a depending cylindrical portion 54 of somewhat less diameter than the body portion of the receptacle, and the plates can engage this cylindrical portion 54 beneath a shoulder 55 located adjacent the junction of the cylindrical portion with the body portion of the receptacle.

Figure 14:
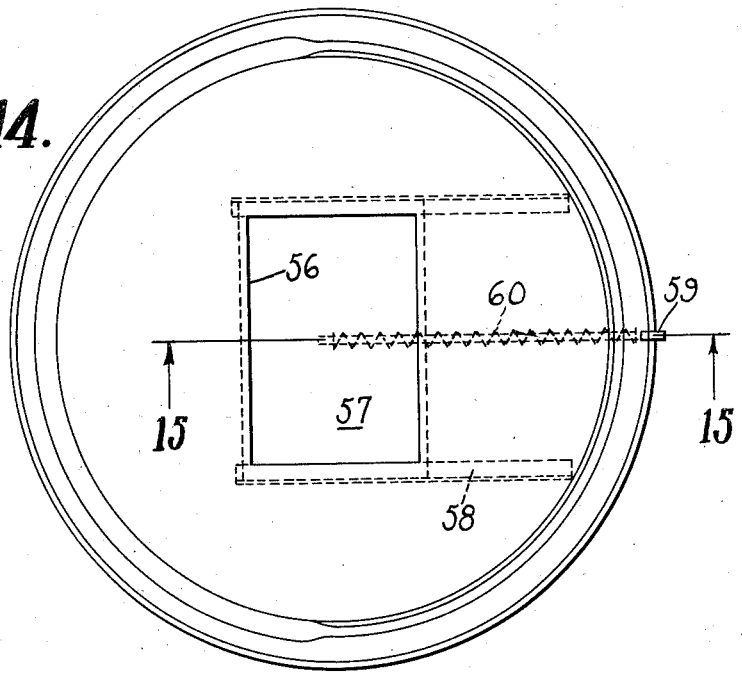
Figs. 14 and 15 illustrate a bird cage base of somewhat modified form, Fig. 14 being a top plan view of the base and Fig. 15 being an enlarged section on line 15—15 of Fig. 14.
Figure 15:
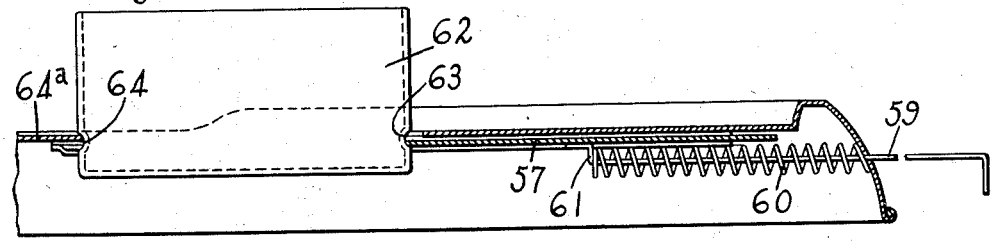

It is not necessary in all cases that the opening in the bottom of the cage be closed by two closure members. In the form shown in Figs. 14 and 15 we have shown a bird cage base having a single closure member. In this form the base of the cage is provided with an aperture 56 of rectangular shape normally closed by a rectangular plate 57 mounted in guides 58. An operating slide 59 attached at its inner end to the plate 57 projects at its opposite end out of the base through a suitable opening in the base. A spring 60 normally has the expanded position shown in dotted lines in Fig. 14 so as to hold the plate 57 in a position to close aperture 56, spring 60 being interposed between the side wall of the base and a depending portion 61 on the under side of plate 57 and surrounding the slide member 59. By pulling on slide member 59, plate 57 may be drawn outwardly so as to uncover aperture 56, and a rectangular bath receptacle 62 may then be placed in the cage. This bath receptacle 62 may have a side groove 63 adapted to be engaged by the inner edge of plate 57 for the purpose of holding the bath receptacle in position in the aperture in the manner shown in Fig. 15. At the opposite side of the receptacle from the groove 63 the receptacle is provided with a further and similar groove 64 adapted to be engaged by the floor 64ᵃ of the base at the edge of the aperture 56. Thus the receptacle is firmly held in place between a portion of the floor on one side and a sliding spring-pressed element on the opposite side. It is not necessary in all cases, however, that the bath receptacle be held in position by engagement therewith of the sliding or other plate adapted to close the aperture in the cage. In the particular case illustrated in Figs. 14 and 15 the spring is under compression when the slide or shutter is open, but the spring might be arranged so that it will be under tension when the slide is open, and the operating slide might be pushed in by the thumb to open the slide instead of being pulled out to open it.

Various changes can be made in the details of the cage structure without departing from the scope of our invention as defined in the claims. We have not attempted to illustrate or describe the many and various modifications which may be made in the cage structure without departure from the principles of our invention.

What we claim is:

1. In a bird cage, the combination of a cage body, a separate base for said body having an aperture accessible from beneath the cage, a bath receptacle having a portion adapted to be introduced into the cage interior so as to project upwardly from the floor of the base, and movable spring-pressed means adapted to close said aperture when said means is in one position, said spring-pressed means having another position in which it engages said receptacle to fix the same in position relatively to the cage.

2. In a bird cage, the combination of a cage body, a separate base for said body having an aperture accessible from beneath the cage, a bath receptacle having a portion adapted to be introduced into the cage interior so as to project upwardly from the floor of the base, and movable spring-pressed means adapted to close said aperture when said means is in one position, said spring-pressed means having another position in which it engages said receptacle to fix the same in position relatively to the cage, said spring-pressed means being located beneath the floor of the base and guided thereon for sliding movement.

ROBERT S. OLIVER.
FRANK V. MEINDL.